United States Patent [19]

Webre, Jr.

[11] Patent Number: 4,918,854
[45] Date of Patent: Apr. 24, 1990

[54] REMOVABLY ATTACHABLE NOISE MAKING LURE ADDITION APPARATUS AND METHOD

[76] Inventor: Jerome B. Webre, Jr., 5252 Twin City Hwy., #465, Groves, Tex. 77619

[21] Appl. No.: 251,805

[22] Filed: Oct. 3, 1988

[51] Int. Cl.⁵ .............................................. A01K 85/00
[52] U.S. Cl. .................................. 43/42.31; 43/42.35; 43/42.22; 43/42.39
[58] Field of Search ................. 43/42.31, 42.35, 42.37, 43/42.38, 42.39, 42.22, 42.53, 42.29

[56] References Cited

U.S. PATENT DOCUMENTS

| | | | |
|---|---|---|---|
| 2,659,176 | 11/1953 | Wenger | 43/42.31 |
| 3,854,233 | 12/1974 | Browning | 43/42.31 |
| 4,008,539 | 2/1977 | Gardner | 43/42.31 |
| 4,015,363 | 4/1977 | Sedlak | 43/42.22 |
| 4,054,004 | 10/1977 | Schott | 43/42.31 |
| 4,483,091 | 11/1984 | Norlin | 43/42.35 |
| 4,630,389 | 12/1986 | Higgins | 43/42.35 |
| 4,712,326 | 12/1987 | Hoover | 43/42.39 |
| 4,747,228 | 5/1988 | Giovengo | 43/42.31 |

Primary Examiner—Kurt Rowan
Attorney, Agent, or Firm—J. Nevin Shaffer, Jr.

[57] ABSTRACT

A removably attachable lure addition comprised of a hollow containment shell forming a containment space including a rigid center section and a weight receiving channel. A removably attachable eye seals the weight receiving channel once weight and noise makers have been introduced into the containment space. The shank end of a hook, which may be attached to any known fish attracting means, such as live or dead bait, plastic worms, and the like, is attached to the base of the generally conically shaped lure addition. Because the line is attached to the eye, which is attached to the lure addition and not to the hook, the lure addition can be changed from one hook and fish attracting means to another easily and quickly. Another embodiment has the weight receiving channel in the base of the cone in combination with a hook with a threaded end so that the hook is securely attached to the base by means of the threads. Yet another embodiment includes utilizing a hollow containment shell that is of a soft pliable material and pushing the shank end of a hook through the base and through the top of the containment shell through a pop through hole. The pop through hole allows the shank end, with an eye in most cases, to exit the containment space, but resists withdrawal of the shank end back into the containment space during use. While in use, the fisherman may adjust the amount of weights so that the removably attachable lure addition is heavier and sinks more quickly to the bottom or lighter and floats more near or at the surface.

9 Claims, 2 Drawing Sheets

REMOVABLY ATTACHABLE NOISE MAKING LURE ADDITION APPARATUS AND METHOD

BACKGROUND OF THE INVENTION

This invention relates to an improved removably attachable noise making lure addition.

The dream of perfecting a perfect fishing lure has possessed fisherman since the dawn of time. A lure that not only is capable of retaining fish on a hook placed near them, but of attracting fish to the hook as well is a lure that will find great acceptance among fisherman, young and old. Far from being the "silent world" that people once thought existed, the waters that fish inhabit are noisy places. The existence of this noisy world has led fisherman to the discovery that lures that themselves make noise have the ability to attract fish. An example of a "noisy" fishing lure is disclosed in Wenger, U.S. Pat. No. 2,659,176. This device is a fishing lure designed to move erratically through the water in a "fish attracting" manner. The interior of the lure contains "rollable balls" used as ballast and to cause the device to wobble and undulate. Additionally, the inventor claims that, as the balls roll back and forth in the lure body, they will cause vibrations tending to attract fish. The Straiter patent, U.S. Pat. No. 3,757,455, discloses a lure with spinners on the front and rear ends of the lure. The lure also contains two chambers, one with balls that rock back and forth within the chamber and knock into each other and into an intermediate wall of the second cavity. This inventor claims a novel sound making cavity is thereby produced.

Parker, U.S. Pat. No. 3,894,350, also utilizes a "noise chamber" within which is trapped a single pellet.

Gowing, U.S. Pat. No. 4,432,156, is yet another fishing lure having weights located within a specifically constructed fish shaped lure. The weights in the Gowing patent are located in the rear of the lure so that when the lure is at rest, the weights will cause the lure to float "in an upstanding position."

Also known in the art are a noise making slip sinker, Gardner, U.S. Pat. No. 4,008,539, and a jig type noise making fishing lure by Hoover et al., U.S. Pat. No. 4,712,326.

A drawback to the noise making fishing lures known in the art is that each of them is a complete entity of itself. That is, the noise maker, the lure, and the hooks are all designed in each of the above described patents as a single package. None of the devices shown in the art are removably attachable to other fish attracting means in a manner that is practical. Further, none of the devices known in the art enable the user to shift the noise making portion of the device to other fish attracting means without cutting the fishing line or removing the attachment to the fishing line. Thus, there is a need in the art for providing a noise making fishing lure that is attachable to a variety of fish attracting means and, further, that provides a noise making addition to lures currently existing. It, therefore, is an object of this invention to provide an improved removably attachable noise making lure addition.

SHORT STATEMENT OF THE INVENTION

Accordingly, the removably attachable noise making lure addition of the present invention includes a hollow containment shell with a weight receiving channel drilled therethrough. A removably attachable eye seals the weight receiving channel once the weights have been inserted and provides a means whereby a fishing line may be attached. The base of the hollow containment shell has an opening designed to receive the end or shank of a hook so that a fishing hook and fish attracting attachments, which may be connected to the fishing hook, can be attached to the removably attachable noise making lure. In a preferred embodiment, the hollow containment shell is conically shaped with the point of the cone representing the forward end and the flat base the rear end. A rigid center section in the top center of the hollow conically shaped shell or frame, provides a strong purchase for the eye previously mentioned. In another embodiment, the eye is attached to the rigid frame and the weight receiving channel is located in the hook receiving space and the butt of the hook to be attached seals this channel.

In another embodiment, the hollow containment shell is soft and flexible and has an opening in the base of the shell and an opening in the top of the cone of the shell. As a result, the base of the hook to be attached is driven through the base of the shell and through the cone from the inside to the outside at the top. The opening in the top of the cone is designed to allow the base of the hook to be pressed through from inside out, but gathers around the base of the cone and resists removal of the hook from the outside in. In this configuration, the weights, preferably BB's, in $\frac{1}{4}$, $\frac{3}{8}$, or $\frac{1}{2}$ ounce sizes, cause less noise against the soft form of the shell, but come into contact with the metal hook and, thereby, cause additional noise. In the hard plastic configuration where the base of the hook does not protrude into the hollow center of the shell, the noise caused by the weights is produced by their action with each other and against the sides of the hard shell.

BRIEF DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
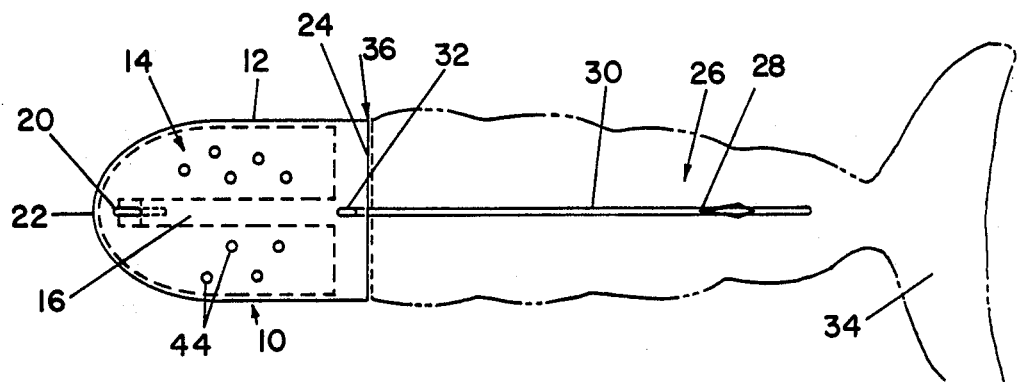
FIG. 1 is a top view of a preferred embodiment of the removably attachable noise making lure addition of the present invention with a fish attracting lure shown in dotted lines.

The preferred embodiment of the present invention is illustrated by way of example in FIG. 1-6. With specific reference to FIGS. 1 and 2, removably attached lure addition 10 includes hollow containment shell 12 with containment space 14. Rigid center section 16 contains weight receiving channel 18. Removably attachable eye 20 is shown secured to hollow containment shell 12 and sealing weight receiving channel 18.

Figure 2:
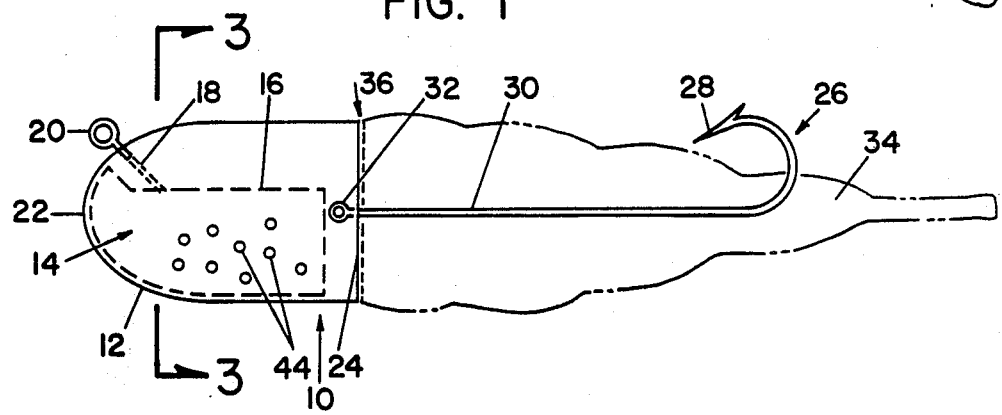
FIG. 2 is a side view of the lure addition.

FIGS. 1 and 2 (as well as 4 and 6) illustrate that hollow containment shell 12 has a generally conical shape from the front 22 to the cone's base 24. The FIGURES also show fish hook 26 comprised of hook 28, shank 30, and shank end 32. Shank end 32 fits securely in an opening in base 24 and rigid center section 16.

FIGS. 1 and 2 (and 4 and 6) show in dotted lines fish attracting means 34. Fish attracting means 34 can be of any known material such as live or dead bait, flexible or semi-flexible plastic worms, or fish shaped artificial lures of any type. The interface 36 between fish attracting means 34 and cone base 24, can be filled with any known cement or sealant so that the adherence of fish attracting means 34 and fish hook 26 to removably attachable lure addition 10 is enhanced.

Figure 3:
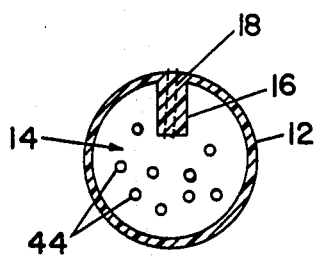
FIG. 3 is a section view taken along lines 3—3 of FIG. 2.

FIG. 3 is a cross sectional view of removably attachable lure addition 10 along lines 3—3 in FIG. 2. FIG. 3 clearly illustrates rigid center section 16 as formed in the top of removably attachable lure addition 10's hollow containment shell 12.

Figure 4:
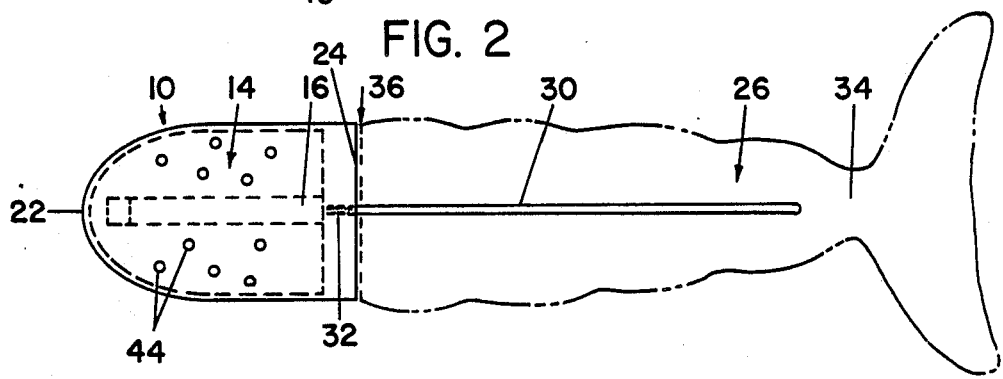
FIG. 4 is a bottom view of the lure addition.

FIG. 4 is a bottom view.

Figure 5:
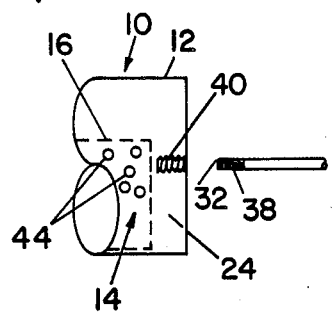
FIG. 5 is a partial section side view showing the weight receiving channel in an alternate location.

Referring now to FIG. 5, another embodiment of removably attachable lure addition 10 is illustrated. In FIG. 5, the embodiment of removably attachable lure addition 10 is shown whereby shank end 32 of fish hook 26 contains threads 38. Threads 38 are designed to enable securement of fish hook 26 in alternate weight receiving channel 40 in the base 24 of hollow containment shell 12.

Figure 6:
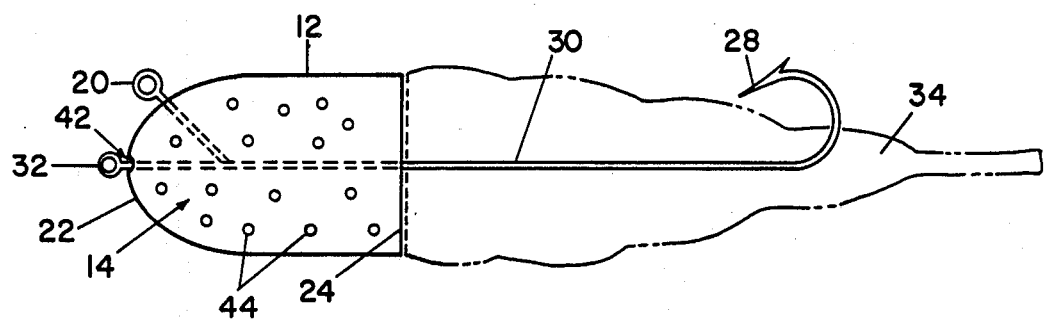
FIG. 6 is a side view of an embodiment where the base of the hook pops through the front of the lure addition.

Referring now to FIG. 6, an alternate embodiment of removably attachable lure addition 10 is also demonstrated. In this embodiment, hollow containment shell 12 is made of a soft flexible material, such as plastic or the like. Fish hook 26 is driven through an opening in cone base 24 through containment space 14 and out the front 22 through hole 42. Pop through hole 42 is designed to allow shank end 32 to be pushed from containment space 14 to the outside, but to resist withdrawal of shank end 32 back into containment space 14.

FIGS. 2, 5, and 6 show weight and noise makers 44 located within containment space 14. In FIGS. 2 and 5, noise is created by two means. Noise is created when weight and noise makers 44 bounce and knock into each other. Additionally, noise is made when weight and noise makers 44 bounce into rigid center section 16 and hollow containment shell 12. In FIG. 6, weight and noise makers 44 make noise in these manners and by coming into contact with solid shank 30 of fish hook 26, additionally.

In operation then, removably attachable lure addition 10 is comprised of hollow containment shell 12 with containment space 14 filled with a selectively desired number of weight and noise makers 44. Once again, weight and noise makers 44 can be of any desired weight known in the art, such as BB's, lead pellets, glass balls, or the like. Weight and noise makers 44 are inserted into containment space 14 by means of weight receiving channel 18. Weight receiving channel 18 is sealed, in one embodiment, by means of removably attachable eye 20. Removably attachable eye 20 and weight receiving channel 18 are located in rigid center section 16 in the preferred embodiment. Once the desired number of weight and noise makers 44 are introduced into containment space 14, removably attachable eye 20 is screwed into weight receiving channel 18, thereby sealing the weight and noise makers 44 in the containment space 14. As the fisherman using removably attachable lure addition 10 proceeds to fish, additional weight and noise makers 44 can be added or subtracted, as desired. Should it be desired to have removably attachable lure addition 10 sink faster and deeper, more weight and noise makers 44 can be added. If it is desired to reduce noise and enable removably attachable lure addition 10 to float near the surface, fewer weight and noise makers 44 can be added, all at the discretion of the individual user.

As the figures illustrate, removably attachable lure addition 10 can be attached to any number of forms of fish hooks and fish attracting means known in the art. A simple bare fish hook 26 may be attached to the base 24 of hollow containment shell 12 or fish attracting means 34, in the form of live or dead bait, plastic or other materials known in the art can be added. If a fish attracting means, such as a plastic worm or fish, is attached to hook 28, then the interface 36 between base 24 and fish attracting means 34 can be covered with a glue or sealant known in the art, so as to enhance retainage of hook 26 to removably attachable lure addition 10. Without glue, shank end 32 is forced into place in base 24 and held there by friction. Glue may also be added.

In another embodiment, illustrated in FIG. 5, alternate weight receiving channel 40 is drilled in base 24 of hollow containment shell 12. In combination with a shank end 32 of fish hook 26 that is provided with threads 38, hook 26 can be screwed into position in base 24 once the desired number of weight and noise makers 44 have been added or subtracted. This is a very secure means of attaching fish hook 26 to removably attachable lure addition 10.

Referring to FIG. 6, an alternate embodiment showing fish hook 26 pressed through base 24 of hollow containment shell 12 and out the front 22 through pop through hole 42. In this embodiment, hollow containment shell 12 is made of some flexible strong material, such as pliable plastic or the like, known in the art. Hook 28 may have shank end 32 with an eye in it similar to eye 20. If this is the case, the eye of hook 28 can be utilized to secure the fishing line to the hook, thereby ensuring that removably attachable lure addition 10 does not come free from hook 26. If this is done, however, it necessitates the removal of the fishing line from fish hook 26 eye, should the removably attachable lure addition 10 need to be changed. As a result, in this embodiment, eye 20 is preferably used so that fishing line, not shown, attached to eye 20 need not be removed when removably attachable lure addition 10 is changed from one hook 26 and fish attracting means 34 to another.

While the present invention has been disclosed in connection with the preferred embodiment thereof, it should be understood that there may be other embodiments which fall within the spirit and scope of the invention as defined by the following claims.

What is claimed is:

1. A removably attachable noise making lure addition comprising:
   A. a hollow containment means;
   B. a weight receiving channel means in said hollow containment means through which weight and noise means are introduced and extracted, said channel means in a base of said hollow containment means to which a hook is removably attached;
   C. a removably attachable eye means, that seals said weight receiving channel means, and to which fishing line is attached;
   D. a hook receiving means in said hollow containment means for removably attaching fishing hooks;

E. a conically shaped hollow outer frame of said hollow containment means;
F. a rigid center section of said frame through which said weight receiving channel passes and into which said removably attachable eye means is secured; and
G. a base of said conically shaped frame to which said hook and a fish attracting means are attached.

2. The lure addition of claim 1 wherein said removably attachable eye means is attached to said rigid center.

3. The lure addition of claim 2 wherein said conically shaped outer frame is soft and flexible and further comprises:
A. a first opening in said base;
B. a second opening, opposite said first base opening, in said conically shaped outer frame; and
C. said second opening formed so as to allow the shank of said hook to pass and so as to resist removal of said shank end.

4. A removably attachable noise making lure addition comprising:
A. a conically shaped hollow outer frame;
B. a weight receiving channel means in a base of said conically shaped hollow outer frame through which weight and noise means are introduced and extracted and to which a hook is removably attached;
C. a rigid center section of said frame through which said weight receiving channel means passes;
D. a removably attachable eye means that seals said weight receiving channel means, and to which fishing line is attached;
E. a base of said conically shaped frame; and
F. a hook receiving means in said base for removably attaching fishing hooks and fishing attracting means.

5. The lure addition of claim 4 wherein said removably attachable eye means is attached to said rigid center.

6. The lure addition of claim 5 wherein said conically shaped outer frame is soft and flexible and further comprises:
A. a first opening in said base;
B. a second opening, opposite said first opening, in said conically shaped outer frame; and
C. said second opening formed so as to allow the shank end of said hook to pass and so as to resist removal of said shank end.

7. A removably attachable noise making lure addition method comprising the steps of:
A. constructing a hollow containment means with a conically shaped hollow outer frame;
B. providing a rigid center section of said frame through which a weight receiving channel passes and into which a removably attachable eye means is secured;
C. forming a base of said conically shaped frame to which a hook and a fish attracting means are attached;
D. forming said weight receiving channel means in said base of said conically shaped frame through which weight and noise means are introduced and extracted, and attaching said fishing hook thereto;
E. introducing said weight and noise means into said hollow containment means through said weight receiving channel means;
F. removably attaching an eye means to said hollow containment means so that said eye means seals said weight receiving channel means and to which fishing line is attached; and
G. providing a hook receiving means in said hollow containment means for removably attaching fishing hooks.

8. The method of claim 7 wherein said conically shaped outer frame is constructed of soft and flexible means and comprises the further steps of:
A. providing a first opening in said base;
B. providing a second opening, opposite said first opening, in said conically shaped outer frame; and
C. said second opening formed so as to allow the shank end of said hook to pass therethrough and so as to resist removal of said shank end.

9. A removably attachable noise making lure addition method comprising the steps of:
A. constructing a conically shaped hollow outer frame formed of a soft and flexible means;
B. forming a weight receiving channel means in said hollow containment means through which weight and noise means are introduced and extracted;
C. introducing said weight and noise means to said conically shaped hollow outer frame through said weight receiving channel means;
D. connecting a removably attachable eye means, that seals said weight receiving channel means and to which fishing line is attached, to said weight receiving channel means;
E. providing a hook receiving means in said hollow outer frame for removably attaching fishing hooks;
F. providing a first opening in a base of said conically shaped hollow outer frame;
G. providing a second opening, opposite said first opening, in said conically shaped outer frame; and
H. forming said second opening so as to allow the shank end of said hook to pass therethrough and so as to resist removal of said shank end.

* * * * *